United States Patent [19]
Greiner et al.

[11] Patent Number: 5,787,232
[45] Date of Patent: Jul. 28, 1998

[54] EFFICIENT DATA-DRIVEN THEORY REVISION SYSTEM

[75] Inventors: Russell Greiner, Plainsboro; R. Bharat Rao, Robinsville; Glenn A. Meredith, Freehold, all of N.J.

[73] Assignee: Siemens Corporate Research, Inc., Princeton, N.J.

[21] Appl. No.: 584,629

[22] Filed: Jan. 10, 1996

[51] Int. Cl.[6] ............................................. G06F 15/18
[52] U.S. Cl. ............................................. 395/10; 395/77
[58] Field of Search ................................ 395/77, 75, 76, 395/10, 51, 911

[56] References Cited

U.S. PATENT DOCUMENTS

| | | | |
|---|---|---|---|
| 4,754,410 | 6/1988 | Leech et al. | 395/51 |
| 4,866,635 | 9/1989 | Kahn et al. | 395/51 |
| 5,107,499 | 4/1992 | Lirov et al. | 395/183.02 |
| 5,265,222 | 11/1993 | Nishiya et al. | 395/51 |
| 5,295,230 | 3/1994 | Kung | 395/75 |
| 5,307,446 | 4/1994 | Araki et al. | 395/77 |
| 5,481,649 | 1/1996 | Birdwell et al. | 395/77 |
| 5,642,472 | 6/1997 | Cohen | 395/77 |
| 5,675,710 | 10/1997 | Lewis | 395/10 |

Primary Examiner—Robert W. Downs
Attorney, Agent, or Firm—Donald B. Paschburg

[57] ABSTRACT

A computer system takes as input an initial fault hierarchy $KB_0$ and a set of annotated session transcripts $C=\{<\pi_j,r_j>\}$ and is given a specified set of revision operators $T=\{\theta_i\}$ where each $\theta_i \in T$ maps a fault hierarchy KB to a slightly different hierarchy $\theta_i(KB)$. The computer system uses T to hill climb from the initial fault hierarchy $KB_0$, through successive hierarchies, $KB_1 \ldots KB_m$, with successively higher empirical accuracies over C. At each stage, to go from a fault hierarchy $KB_k$ to its neighbor $KB_{k+1}$, the computer system must evaluate $KB_k$'s accuracy over C, as well as the accuracy of each $KB' \in N(KB_k)$. The computer system provides an efficient way of evaluating the accuracy of $KB_k$, and each $\theta_i(KB_k)$, towards determining which, if any, $\theta_i(KB_k)$ is more accurate than $KB_k$. It exploits a few key observations. First, as each transformation used to map one hierarchy to a related one performs only local changes to the hierarchy, it will have only minor and easily computed effects on any instance. Second, most transformations will have no effect on many instances. Finally, one can bound how much the accuracy score for a knowledge base can change based on any instance, which means branch-and-bound techniques can be used to avoid computing the accuracy scores for various hierarchies that cannot be optimal.

10 Claims, 18 Drawing Sheets

Procedure EVALKB( KB: fault_hierarchy,
          $\pi$: problem_instance ): repair
  return( EVALNODE( ROOT(KB), $\pi$ ) )
End EVALKB

Procedure EVALNODE( $n$: node,
        $\pi$: (total)_problem_instance ): repair
  If $n$ is a leaf node
  Then return( $r(n)$ )
  Else For $i$ := $1..k(n)$
          $n_i$ := child($n, i$)
          If $\pi( t(n_i) ) = +$
          Then return( EVALNODE( $n_i, \pi$ ) )
        End For
        return( $r_\perp$ )
End EVALNODE

FIGURE 3

Procedure AccNode( $n$: node,
$\pi$: (partial)_problem_instance,
$r$: repair ): Real
If $n$ is a leaf node
Then return( $r(n) = r$ ? 1 : 0 )
Else tot := 0;   reach_me = 1;
   For $i := 1..k(n)$
      $n_i :=$ child$(n, i)$
      If $\pi( t(n_i) ) = +$
      Then tot += reach_me $\times$
         AccNode( $n_i, \pi, r$ )
         return( tot )
      ElseIf $\pi( t(n_i) ) = ?$
         tot += reach_me $\times$
            $p'( n_i ) \times$ AccNode( $n_i, \pi, r$ )
         reach_me $\times= 1 - p'( n_i )$
   End For
   return( tot )
End AccNode

FIGURE 4

Procedure AccNode*( $n$: node,
            $\pi$: (partial)_problem_instance,
            $r$: repair ): Real
If $n$ is a leaf node
Then return( $r(n) = r$ ? 1 : 0 )
Else tot = 0;  reach_me = 1;
    unknowns = {}
    For $i = 1..k(n)$
        $n_i$ = child($n, i$)
        If $\pi( t(n_i) ) = +$
        Then tot += reach_me
                × AccNode*( $n_i, \pi, r$ )
            return( tot )
        ElseIf $\pi( t(n_i) ) = ?$
        Then  If $\neg t(n_i) \in$ unknowns
            Then tot += reach_me
                    × AccNode*( $n_i, \pi, r$ )
                return( tot )
        ElseIf $t(n_i) \notin$ unknowns
            Then unknowns = unknowns $\cup$ $t(n_i)$
                tot += reach_me × $p(n_i)$ ×
                    AccNode*( $n_i, \pi, r$ )
                reach_me ×= $1 - p(n_i)$
    End For
return( tot )
End AccNode*

Procedure DELTADELTA( KB: fault_hierarchy,
    C: set_of_problem_instances ): fault_hierarchy;
Q := {}
rem_insts := $|C|$;
$Err := \Sigma_{c_i \in C}(1 - acc(KB, c))$
$s^* := 0$;
For $\langle \pi, r \rangle$ in C
  QE_COMPUTERHOTAU( KB, $\pi$, $r$ );
  For $\theta$ in GoodThetas
    If ( RTP( s, $Err$ )
            && RTM( s, rem_insts, $s^*$ ) )
      $s' := s +$ QE_DIFF( KB, $\theta$ );
      Q := REPLACE( Q, $\theta$, $s'$ );
  End For
  $Err := Err - (1- acc(KB, \langle \pi, r \rangle ))$;
  $\langle \theta^*, s^* \rangle :=$ BEST( Q ); End For
If $(s^* > 0)$
    return( DELTADELTA( $\theta^*$(KB), C ) )
Else
    return( KB)
End DELTADELTA

FIG. 8B

Procedure BEST( Q: transform_score_pairs):
    transform_score;
 $bsf_s := -999999;$  $bsf_\theta := NoOp;$
 While (Q not empty)
  $\langle \theta, s \rangle := $ FIRST( Q ); $Q := $ REST( Q )
  If $(s > bsf_s)$
   $bsf_s = s;$  $bsf_\theta = \theta$
 End While
 return( $\langle bsf_\theta, bsf_s \rangle$ );
End BEST

Procedure REPLACE(
    Q: transform_score_pairs,
    $\theta$: transform, s: Real):
    transform_score_pairs;
 $Q' = Q$
 While ($Q'$ not empty)
  $\langle \theta', s' \rangle := $ FIRST( $Q'$ ); $Q' := $ REST( $Q'$ )
  If $(\theta' = \theta)$
   Replace 2nd part of $\langle \theta', s' \rangle$ with $s$
   Return( Q )
 End While
 return( $Q \cup \langle \theta, s \rangle$ );
End REPLACE

Procedure RTP( s: Real, *Err*: Real): boolean;
  return( s > - *Err* );
End RTP

Procedure RTM( s: Real, rem_insts: Int,
        $s^*$: Real): boolean;
  return( s > $s^*$ - rem_insts );
End RTM

Procedure RTI_ELIGIBLE( KB: fault_hierarchy,
 $\langle \pi, r \rangle$: training_example ):
 list_of_transformations
 N := append( RTIADD(KB, $\langle \pi, r \rangle$),
  RTIDELETE(KB, $\langle \pi, r \rangle$),
  RTIMOVE(KB, $\langle \pi, r \rangle$),
  RTISWITCH(KB, $\langle \pi, r \rangle$) )
 return( N )
End RTI_ELIGIBLE

Procedure GOODNODE( $n$: node,
  $\pi$: problem_instance ): boolean
 return( $\tau(n) > 0$ && $\pi(\ t(n)\ ) \in \{+, ?\}$ )
End GOODNODE

Procedure ISANCESTOR( $n_1$, $n_2$)
 If ( $l(n_2) = 0$ )
 Then return( FALSE )
 Else for i := 1..$l(n_2)$
  $p_2$ := parent( $n_2$, i )
  If ( ($n_1 = p_2$) $\vee$ ISANCESTOR( $n_1$, $p_2$ ) )
  Then return( TRUE )
  endfor
 return( FALSE )
End ISANCESTOR

FIG. 11B

Procedure RTIADD( KB: fault_hierarchy,
⟨$\pi, r$⟩: training_example ):
list_of_transformations
N := { }
for p ∈ AllNodes(KB) such that
$k(p) \geq 1$ and GoodNode(p, $\pi$)
for c ∈ AllNodes(KB) such that
$c \neq p$ and $\pi(c) \in \{+, ?\}$
If ( ¬child_p( p, c )
&& ¬IsAncestor(c, p) )
Then for j := 1..( k(p)+1 )
N := append(N, ADD(p,c,j) )
endfor; endfor; endfor
return( N )
End RTIADD

FIG. 11C

Procedure RTIDELETE( KB: fault_hierarchy,
 $\langle \pi, r \rangle$: training_example ):
 list_of_transformations
N := { }
for p ∈ AllNodes(KB) such that
 k(p) > 0 and GoodNode(p)
 for j := 1..k(p)
 If GoodNode( child(p, j) )
 Then N := append(N, Delete(p, child(p, j)))
 endfor
endfor
return( N )
End RTIDELETE

FIG. 11D

Procedure RTIMOVE( KB: fault_hierarchy,
$\langle \pi, r \rangle$: training_example ):
list_of_transformations
N := { }
for p $\in$ AllNodes(KB) such that
$k(p) \geq 2$ and GoodNode(p, $\pi$ )
for i := 1..k(p)
If GoodNode( child( p, i ), $\pi$) Then
for j := 1..k(p); j $\neq$ i
N:=append(N, MOVE(p,p,child(p,i),i,j))
endfor; endfor; endfor

FIG. 11E for from_par ∈ AllNodes(KB) such that
        k(from_par) > 0
  for to_par ∈ AllNodes(KB) such that
      to_par ≠ from_par   and k(to_par) > 0
      and ( GoodNode(to_par, $\pi$ ) ∨
                GoodNode(from_par, $\pi$) )
    for i := 1..k(from_par)
      ch := child( from_par, i )
      If (GoodNode( ch, $\pi$ )
            && ¬IsAncestor(ch, to_par) )
      Then for j := 1..k(to_par)+1
        N := append( N,
                MOVE(from_par, to_par, ch, i, j) )
      endfor; endfor; endfor; endfor
  return( N )
End RTiMove

FIG. 11F

Procedure RTiSwitch( KB: fault_hierarchy,
  $\langle \pi, r \rangle$: training_example ):
    list_of_transformations
N := { }
for p $\in$AllNodes(KB) such that
    k(p) $\geq$ 2 and GoodNode( p, $\pi$ )
  for i := 1..(k(p) - 1 )
    If GoodNode( child(p,i), $\pi$ )
    Then for j := i..k(p)
      If GoodNode( child(p,j), $\pi$ )
      Then N := append(N,
          SWITCH(p, child(p,i), child(p,j) ) )
    endfor; endfor; endfor
  return( N )
End RTiSwitch

|  | $c_1$ ... | $c_j$ | ... $c_{|\mathcal{C}|}$ | $\mathcal{C}$ |
|---|---|---|---|---|
| $KB$ | · ... | · | ... · | $\text{acc}(KB, \mathcal{C})$ |
| $\theta_1(KB)$ | · ... | · | ... · | $\text{acc}(\theta_1(KB), \mathcal{C})$ |
| ⋮ | ⋮ | · | ⋮ | ⋮ |
| $\theta_i(KB)$ | · ... | $\boxed{\text{acc}(\theta_i(KB), c_j)}$ ... | · | $\text{acc}(\theta_i(KB), \mathcal{C})$ |
| ⋮ | ⋮ | · | ⋮ | ⋮ |
| $\theta_m(KB)$ | · ... | · | ... · | $\text{acc}(\theta_m(KB), \mathcal{C})$ |

FIGURE 12

EFFICIENT DATA-DRIVEN THEORY REVISION SYSTEM

BACKGROUND OF THE INVENTION

1. Field of the Invention

The present invention relates to a part of a "theory revision" system that identifies a revision which produces a theory with highest accuracy and more particularly, to a system that efficiently uses a given set of annotated session transcripts and a given set of possible theory-to-theory revision operators to modify a given theory, encoded as a fault hierarchy, to form a new theory that is optimally accurate.

2. Description of the Prior Art

Many expert systems use a fault hierarchy to propose a repair for a device based on a set of reported symptoms test values. Unfortunately, such systems may return the wrong repair if their underlying hierarchies are incorrect. A theory revision system uses a set, C, of "labeled session transcripts" (each transcript includes answers to the tests posed by the expert system and the correct repair as supplied by a human expert) to modify the incorrect fault hierarchy, to produce a new hierarchy that will be more accurate. Typical revision systems compare the initial hierarchy, KB, with each of its neighbors in $N(KB)=\{KB_k\}$, where each $KB_k$ is formed from KB by performing a single simple revision, such as deleting a connection between a pair of fault nodes, or altering the order in which some fault nodes are considered. These revision systems will climb from KB to a neighboring $KB^* \in N(KB)$ if $KB^*$'s empirical accuracy over C is significantly higher than KB's.

There are many theory revision systems described in the machine learning literature. Most resemble the present invention by using a set of transformations to convert one theory to another. Many of the other systems, however, focus on Horn clause knowledge bases or decision trees; representations that are not particularly suited to deployed application systems. It is an object of the present invention to use the widely deployed fault hierarchy representation. Further, the modifications suggested by existing theory revision systems could result in theories which would be rejected by domain experts. It is a further object of the present invention to suggest modifications which preserve the structure of the fault hierarchy, and so are more likely to be acceptable to domain experts. Finally, these prior art systems assume that the training data (i.e., the annotated session transcripts), used to decide which knowledge base is most accurate, will include answers to all relevant tests. This is not realistic in many standard situations, where each training instance includes only the minimal amount of information required to reach an answer, relative to a particular theory. In contrast, the DELTADELTA system of the present invention is designed to evaluate any theory's accuracy, even with incomplete data.

Moreover few of these systems are concerned with computational efficiency. In particular, the obvious way to implement each hill climbing step involves first empirically evaluating the initial KB and each $KB_i \in N(KB)$, over the entire set of case reports. However, it can be very expensive to evaluate a single hierarchy on a single report, and worse, there can be a great many reports and huge number of neighbors. It is an object of the present invention to provide an efficient way to determine which $KB_i \in N(KB)$ has the highest empirical accuracy, if that accuracy is greater than KB's.

SUMMARY OF THE INVENTION

The present invention is a computer system, known as DELTADELTA, which takes as input an initial fault hierarchy $KB_0$ and a set of annotated session transcripts $C=\{<\pi_j,r_j>\}$, where $\pi_j$ includes the answers to all tests presented to the expert system, and the correct repair $r_j$ is supplied by a human expert. The present invention is given a specified set of revision operators $T=\{\theta_i\}$ where each $\theta_i \in T$ maps a fault hierarchy KB to a slightly different hierarchy $\theta_i(KB)$. This revised fault hierarchy $\theta_i(KB)$ is called a neighbor of KB, and the set of all neighbors of KB, $N(KB)=\{\theta_i(KB)\}$, is KB's neighborhood.

The present invention uses T to hill climb from the initial fault hierarchy $KB_0$, through successive hierarchies, $KB_1 \ldots KB_m$, with successively higher empirical accuracies over C; the final hierarchy, $KB_m$, is a local optimum in the space defined by the revision operators. At each stage, to go from a fault hierarchy $KB_k$ to its neighbor $KB_{k+1}$, the present invention must evaluate $KB_k$'s accuracy over C, as well as the accuracy of each $KB' \in N(KB_k)$. Let $KB^*$ be the hierarchy with the largest empirical accuracy. If this $KB^*$ is more accurate than $KB_k$, this $KB^*$ hierarchy becomes the new standard, labeled $KB_{k+1}$, and the theory revision process iterates, seeking a neighbor of this $KB_{k+1}$, that is more accurate than $KB_{k+1}$ over the set of examples C, and so forth. Otherwise, if no $KB'$ is more accurate than $KB_k$, the hill climbing process will return this $KB_k$, and terminate. The present invention differs from the Delta system, described in application Ser. No. 08/583,249, filed Jan. 5, 1996, by providing an efficient means for evaluating the accuracy of a set of knowledge bases, $KB' \in N(KB_k)$.

If the labeled session transcripts $C=\{<\pi_j,r_j>\}$ are complete (that is, each $c_j \in C$ contains answers to every possible test in KB) then it is straightforward to evaluate KB's empirical accuracy over C. In practice, however, C is typically incomplete, as each $\pi_j$ contains only a small subset of the test values in KB. The theory revision system of the present invention provides a way of evaluating the empirical accuracy of KB, and each $KB' \in N(KB)$, even when C is incomplete.

Moreover, the evaluator (within the theory revision system) of the present invention provides an efficient way of evaluating the accuracy of $KB_k$, and each $\theta_i(KB_k)$, towards determining which, if any, $\theta_i(KB_k)$ is more accurate than $KB_k$. It exploits a few key observations. First, as each transformation used in the present invention to map one hierarchy to a related one performs only local changes to the hierarchy, it will have only minor, and easily computed, effects on any instance. Second, most transformations will have no effect on many instances. Finally, one can bound how much the accuracy score for a knowledge base can change based on any instance, which means branch-and-bound techniques can be used to avoid computing the accuracy scores for various hierarchies that cannot be optimal. For these reasons, a straightforward analysis allows for the system to avoid a great deal of brute-force empirical computation.

BRIEF DESCRIPTION OF THE DRAWINGS

FIG. 3 illustrates the EVALKB and EVALNODE Subroutines of one embodiment of the present invention.

FIG. 4 illustrates the ACCKB Subroutine of one embodiment of the present invention.

FIG. 6 illustrates the ACCNODE* Subroutine of one embodiment of the present invention.

FIG. 8 illustrates the DELTADELTA Subroutine of one embodiment of the present invention.

FIG. 9 illustrates the RTP and RTM Subroutines of one embodiment of the present invention.

FIG. 11 illustrates the RTI_ELIGIBLE and associated Subroutines of one embodiment of the present invention.

FIG. 12 illustrates the information required by any single step in the theory revision process.

DETAILED DESCRIPTION OF THE INVENTION

Figure 1:
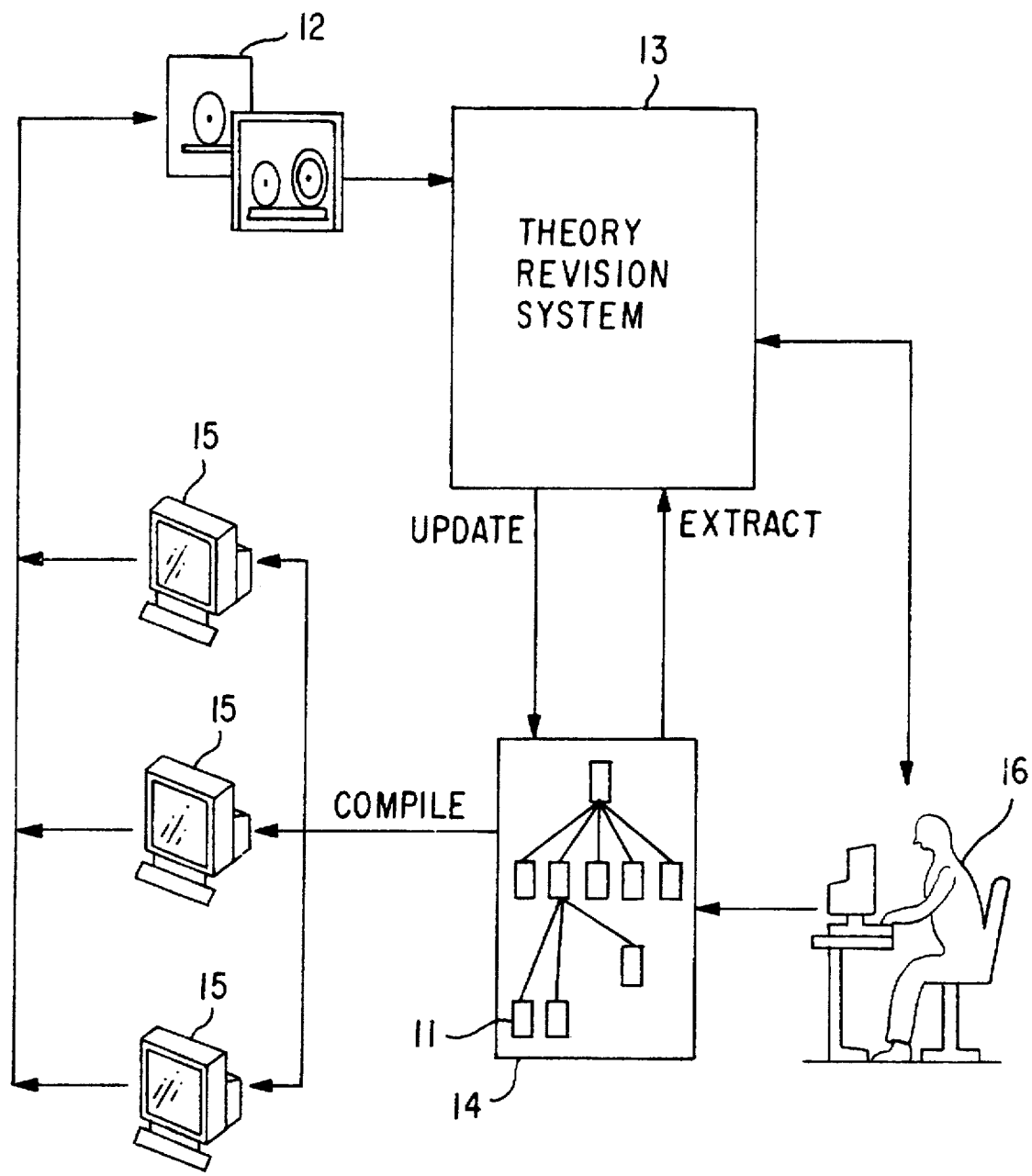
FIG. 1 illustrates an overall theory revision task that utilizes the present invention.

FIG. 1 illustrates the overall theory revision task. The overall task is also described in U.S. patent application, Ser. No. 08/583,249, entitled "The Delta Learning System For Using Expert Advice To Revise Diagnostic Expert System Fault Hierarchies", Filed Jan. 5, 1996, assigned to the same assignee as the present invention and hereby incorporated by reference. Given a knowledge base 11 KB and user feedback (a set of training examples, each a session transcript 12 annotated by a correct answer) a theory revision system 13 produces a new knowledge base KB' which exhibits better performance over the training examples. In more detail, session transcripts 12 are collected after deploying the expert system 14 to field users 15. Each transcript 12 will include answers to the tests requested by the expert system 14 as well as the repair suggested by the expert system 14. When appropriate (such as when the suggested repair is incorrect), a domain expert 16 will annotate these transcripts to indicate missing tests and appropriate repairs. The theory revision system 13 (such as the present invention) uses these annotated transcripts as training data to suggest revisions to the knowledge base 11. Finally, the domain expert 16 evaluates these revisions to decide whether to incorporate them into the knowledge base 11 which can then be redeployed.

Many currently deployed expert systems use a fault hierarchy to propose a repair for a device, based on a set of reported symptoms. Unfortunately, due to modifications of the basic devices, new distribution of faults as the device ages and the installation of new devices, as well as errors in the original knowledge base, these proposed repairs may not always be the correct repair. A "theory revision" system uses a set of "labeled session transcripts" to modify the incorrect fault hierarchy to produce a new hierarchy that is more accurate. As no efficient algorithm is guaranteed to find the globally-optimal hierarchy, many projects implement their theory revision systems as a hill-climbing process that climbs, in a series of steps, to a hierarchy whose accuracy is locally optimal. On each step, each such system computes the empirical accuracy, relative to the given set C of labeled session transcripts, of the current hierarchy KB and each of KB's "neighbors", $N(KB)=\{KB_k\}$, where each neighbor $KB_k \in N(KB)$ is a slight modification of KB. The theory revision system then selects the neighbor $KB^* \in N(KB)$ with the highest empirical accuracy and if $KB^*$'s accuracy is greater than KB's, the theory revision process iterates. It then compares this $KB^*$ with each of its neighbors and climbs to any neighbor that is better. If the labeled session transcripts $C=\{<\pi_j, r_j>\}$, are complete (that is, each $C_j \in C$ contains answers to every possible test in KB) then it is straightforward to evaluate KB's empirical accuracy over C. In practice, however, C is typically incomplete, as each $\pi_j$ contains only a small subset of the test values in KB. The theory revision system of the present invention provides a way of evaluating empirical accuracy of a fault hierarchy and each of its neighbors, relative to a given set of labeled session transcripts, even when the transcripts are incomplete.

The present invention provides an efficient way of evaluating the empirical accuracy of a fault hierarchy and each of its neighbors, relative to a given set of labeled case reports. This application will provide the framework for the present invention, by describing the operation of the underlying expert system and summarizing the theory revision task. It will next describe ways of implementing a theory revision system for this task: first summarizing the obvious exhaustive algorithm, then providing the insights that lead to a more efficient "data-driven" theory revision system and finally describing the DELTADELTA algorithm of the present invention.

The following defines the structures of both fault hierarchies and of problem instances and then describes how a fault-hierarchy-based expert system works: by evaluating a hierarchy in the context of an instance to produce a repair. Each fault hierarchy $KB=<N, E, TS, R, t(\cdot), r(\cdot), child(\cdot,\cdot)>$ is a directed-acyclic forest $<N,E>$, whose nodes, N, represent faults, and whose edges, E, connect faults to subordinate faults. Each node $n \in N$ is labeled with a test $t(n)=t$ or $t(n)=\neg t$, where $t \in TS$. In addition, each leaf node is also labeled with a "repair", $r(n)=r \in R$. The arcs under each internal node are ordered; child(n,i) refers to the "$i^{th}$ child of n". To simplify the notation, let the $k:N \rightarrow Z^+$ function map each node to its number of children, and let the $1:N \rightarrow Z^+$ function map each node to its number of parents.

Figure 2:
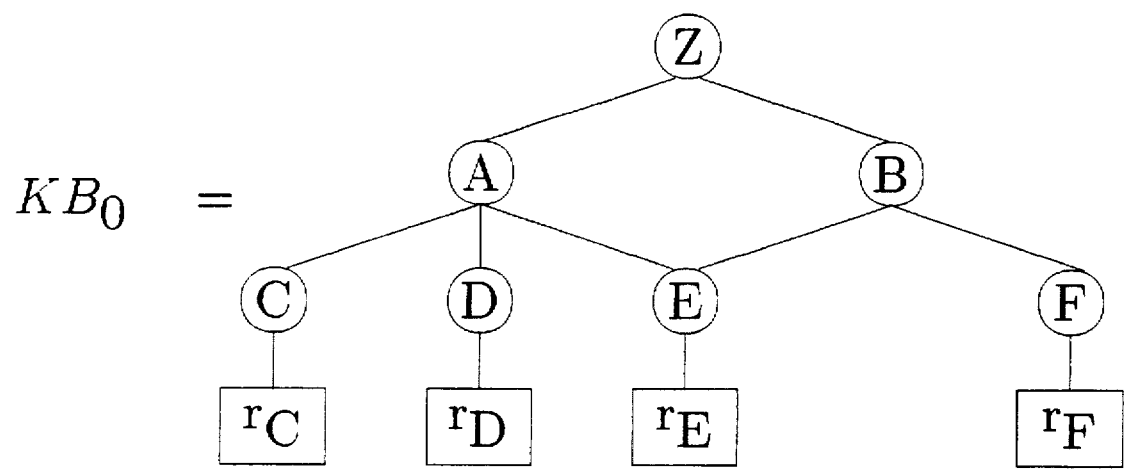
FIG. 2 illustrates the structure of a fault hierarchy ($KB_0$) used by one embodiment of the present invention.

For example, consider the hierarchy shown in FIG. 2, where the test associated with the node $\chi$ is $T_\chi$. Hence, the test associated with the A node is $T_A$, etc. The $r_\chi$ expression is the repair labeling the associated leaf node $\chi$. Hence, the repair associated with the node D, whose test is $T_D$, is $r_D$. A's children are, in order, C, D and E. Hence child(A, 1)=C, child(A, 2)=D and child(A, 3)=E. Here, k(A)=3. Similarly, 1(A)=1.

When run, the expert system that uses the KB hierarchy, called $S_{KB}$, will ask the user a series of questions. These questions correspond to a depth-first, left-to-right, no-backtrack traversal of (part of) the KB structure. Here, $S_{KB0}$ begins at the root, and asks the question associated with that node; here "Is $T_Z$ true?". If the user answers "yes", $S_{KB0}$ descends to consider Z's children, in left-to-right order, here next asking "Is $T_A$ true?". If the user responds "Yes", $S_{KB0}$ will descend to A's children. If the user answers $T_C$ with "No", $S_{KB0}$ will continue to C's sibling D, and ask about $T_D$. Assuming the user responds "Yes" here, $S_{KB0}$ will return the repair associated with that leaf node, D, here $r_D$. On the other hand, if the user had responded "No" to $T_D$, $S_{KB0}$ would have continued to ask about $T_E$. If this answer was "Yes", $S_{KB0}$ would return $r_E$. Otherwise, if this answer was also "No", $S_{KB0}$ would return the "No-Repair-Found" answer, $r_\perp$. N.b., $S_{KB0}$ will not then continue to B; answering $T_A$ with "Yes" means the user will only consider tests and repairs under this node.

Ignoring the details of the actual user-interaction, each "total problem instance" is an assignment $\pi: TS \rightarrow \{+,-\}$ that maps each test to one of $\{+,-\}$, where "+" means the test was confirmed (passed), and "−" means the test was disconfirmed (failed). Given an instance $\pi$, $S_{KB}$ will return a repair $r \in R$, written as EVALKB(KB, $\pi$)=r. This r is the value returned by EVALNode(ROOT(KB), $\pi$), using the EVALNode subroutine shown in FIG. 3, where $n_{root}$=ROOT(KB) is KB's root. On calling EVALNode, it is assumed that the test associated with $n_{root}$ has already been confirmed, i.e., that $\pi(t(n_{root}))$=+. This test $t(n_{root})$ is viewed as the symptom or triggering information. $S_{KB}$ only considered using this subtree after it observed this test value. It is also assumed that the root's test has been confirmed when dealing with the AccKB subroutine defined below.

The accuracy of the hierarchy KB for the instance $\pi$ is $$acc(KB, <\pi, r_{cor}>) = \begin{cases} 1 \text{ if } EVALB(KB,\pi) = r_{cor} \\ 0 \text{ otherwise} \end{cases}$$

where the correct answer to the instance is $r_{cor} \in R$. (This $r_{cor}$ repair is often supplied by a human expert.) In general, such a pair $<\pi, r_{cor}>$ will be referred to as a "labeled (total) problem instance". Over a set of labeled instances (a.k.a. session transcripts) $C=\{<\pi_i, r_i>\}_i$, KB's (empirical) accuracy is $$acc(KB, C) = \sum_{<\pi, r> \in C} acc(KB, <\pi, r>) \qquad (1)$$

The average accuracy is this value divided by the number of examples, |C|.

These computations assume that $S_{KB}$ is always able to obtain answers to all relevant tests. This is not always true in the theory revision context. Here, the theory revision system may only know some of the required answers. To allow us to consider the results an expert system might produce in such contexts, we use a "partial problem instance" $\pi: TS \rightarrow \{+,-,?\}$ where "$\pi(t)=?$" means that the value of the test t is not known.

Each such partial instance $\pi$ really corresponds to some total instance a $\pi'$, where certain test values are not observed. To state this more precisely, say that the total problem instance $\pi': TS \rightarrow \{+,-\}$ is a completion of $\pi$ if $\pi'$ agrees with $\pi$ whenever $\pi(t)$ is categorical (i.e., is not "?"):

$\pi'$ completes $\pi$ iff $[\pi(t) \neq ? \Rightarrow \pi'(t) = \pi(t)]$

Hence the total instance $\pi_{T1} = \{T_Z/+, T_A/+, T_B/-, T_C/-, T_D/+, T_E/+, T_F/-\}$ is a completion of the partial instance $\pi_{P1} = \{T_Z/+, T_A/+, T_B/?, T_C/-, T_D/+, T_E/?, T_F/?\}$.

Let

Complete($\pi$)=$\{\pi': TS \rightarrow \{+,-\} | \pi'$ completes $\pi\}$ refer to the set of total instances that complete a given partial instance.

In general, the probability $\Pr[\pi'|\pi]$ that the observed partial instance $\pi$ corresponds to the total instance $\pi' \in$ Complete($\pi$) depends on the probability that each unobserved test t (i.e. where $\pi(t)$="?") has the specified value $\pi'(t)$. Here, the probability that the observed $\pi_{P1}$ corresponds to the actual total $\pi_{T1}$, depends on the probabilities that $T_B$=−, $T_E$=+ and $T_F$=−. It will be assumed that these tests are independent (of each other and other context) which means this conditional probability can be expressed in terms of the probability function $p:TS \rightarrow [0,1]$, where p(t) is the probability that the unobserved test t would succeed, if only it had been run and reported.

Notice that each $\pi' \in$ Complete($\pi$) has an associated repair, $r_{\pi'}$=EVALKB(KB,$\pi'$); we can therefore use the p($\cdot$) values to compute the probability that $S_{KB0}$ will return each $r_{\pi'}$, given the observed values $\pi$. In general, we will need to compute the probability that $S_{KB0}$ will return the correct repair $r_{cor}$, $\Pr[S_{KB0}$ returns $r_{cor}|\pi$ observed]. As this quantity corresponds to acc(KB, $<\pi, r_{cor}>$) when $\pi$ is a total instance, acc($\cdot, \cdot$) can be extended to be this probability value in general, even when $\pi$ is a partial instance. (The p($\cdot$) function is implicit in this acc(KB, $<\pi, r_{cor}>$) description.)

Figure 5:
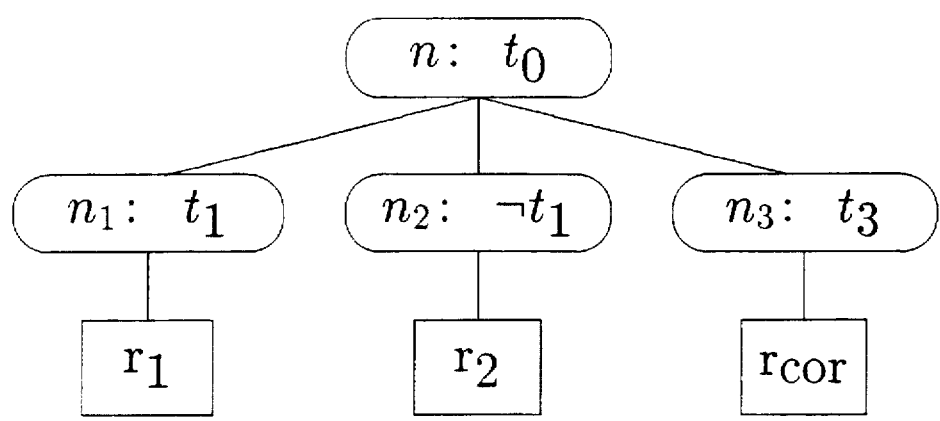
FIG. 5 illustrates that nodes can be dependent, even if distinct tests are independent. ACCNODE* will correct this problem.

The AccKB subroutine illustrated in FIG. 4 computes this accuracy score, for a partial problem instance $\pi$. It returns the correct value whenever the tests associated with the nodes are independent; i.e., if the event that one node's test t(n) is confirmed is independent of whether any of the other node's test t(n') was confirmed. Unfortunately, this is not always the case. If all nodes are labelled with different tests (i.e., n≠n' implies t(n)≠t(n')), then this condition holds whenever the tests are independent—which can be assumed. However, this independent node condition can fail if different nodes are labelled with the same test, even if the tests are independent. For example, consider the structure shown in FIG. 5, where $n_1$=child(n,1) is labeled with the test $t_1$, $n_2$=child(n,2) is labled with test ¬ $t_1$ and $n_3$'s repair is the correct $r_{cor}$; and assume $S_{KB}$ has reached and traversed this top n with probability 1 (i.e., the $t_0$ test is known to succeed). Here AccKB will compute that the probability of reaching $n_3$=child(n, 3) is $(1-p(t_1)) \times p(t_1)$, which suggests the probability of success is $p(t_3) \times [(1-p(t_1)) \times p(t_1)]$. Of course, the real probability of this event is 0.

Unfortunately, for general dag-structures, the task of computing the probability of reaching any particular repair and hence of computing acc(KB, c) is NP-hard. It cannot be expected to have an efficient algorithm that will compute the correct answer in every situation. Instead, algorithms can be utilized that work correctly in many typical situations.

Figure 7:
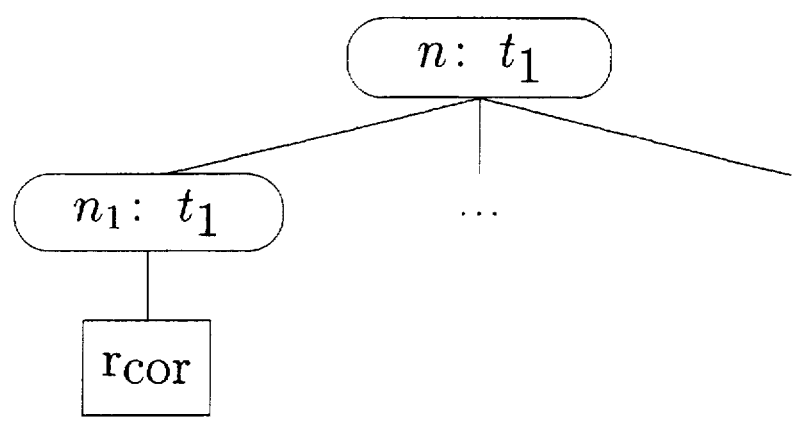
FIG. 7 illustrates the dependencies between parent and child nodes, which will cause ACCNODE* Subroutine to produce incorrect response.

The present invention therefore uses a slight extension to the AccKB subroutine, called AccKB* and shown in FIG. 6, that maintains the dependencies across sibling nodes, and so will correctly handle the case mentioned above. However, it does not maintain other dependencies, meaning it may not return the correct answer if, say, both n and $n_1$=child(n, 1) are each labeled with $t_1$, where $\pi(t_1)$="?" as shown in FIG. 7. Here AccKB*, like AccKB, would claim that the probability of reaching the $r_{cor}$ repair, assuming it reached n, is $p(t_1) \times p(t_1)$; the correct value of course is simply $p(t_1)$.

The following will describe the theory revision task. The main DELTADELTA routine (FIG. 8) takes as input an initial hierarchy $KB_0$ and a set of labeled session transcripts, $C = \{C_j\}$. DELTADELTA uses a set of transformations, $T = \{\theta_k\}$, where each $\theta_k$ maps one hierarchy to another. DELTADELTA considers four classes of revision operators:

each Delete$_{par,n}$ revision operator deletes the existing link between the node par and its child node n. Hence, Delete$_{B,E}$($KB_0$) is a hierarchy $KB_1$ that includes all of the nodes of $KB_0$ and all of its arcs except the arc from B to E. Hence, in $KB_1$, child(B, 1)=F. Notice that this deletion implicitly redefines the child($\cdot, \cdot$) function.

each Add$_{par,n,i}$ revision operator adds a new link between par and n as the i$^{th}$ arc under par. Hence, the hierarchy $KB_2 = Add_{A,F,2}(KB_0)$ includes all of the nodes and arcs in $KB_0$ and an additional arc from A to F, coming after <A,C> and before <A,D>. Hence, in $KB_2$, child(A, 1)=C, child(A,2)=F, child (A, 3)=D and child(A, 4)=E.

Notice, $Delete_{A,F}(Add_{A,F,2}(KB_0)) = KB_0$.

each $Move_{par1,par2,n,i}$ revision operator both deletes the existing link between par1 and n, and then adds a link from par2 to n, as the $i^{th}$ arc under par2. Hence, $Move_{par1,par2,n,i}(KB) = Add_{par2,n,i}(Delete_{par1,n}(KB))$.

each $Switch_{par,n1,n2}$ revision operator switches the order of the links from par to n1, and from par to n2. Notice each $Switch_{n1,n2,par}$ revision operator corresponds to at most two move revision operators.

Figure 10:
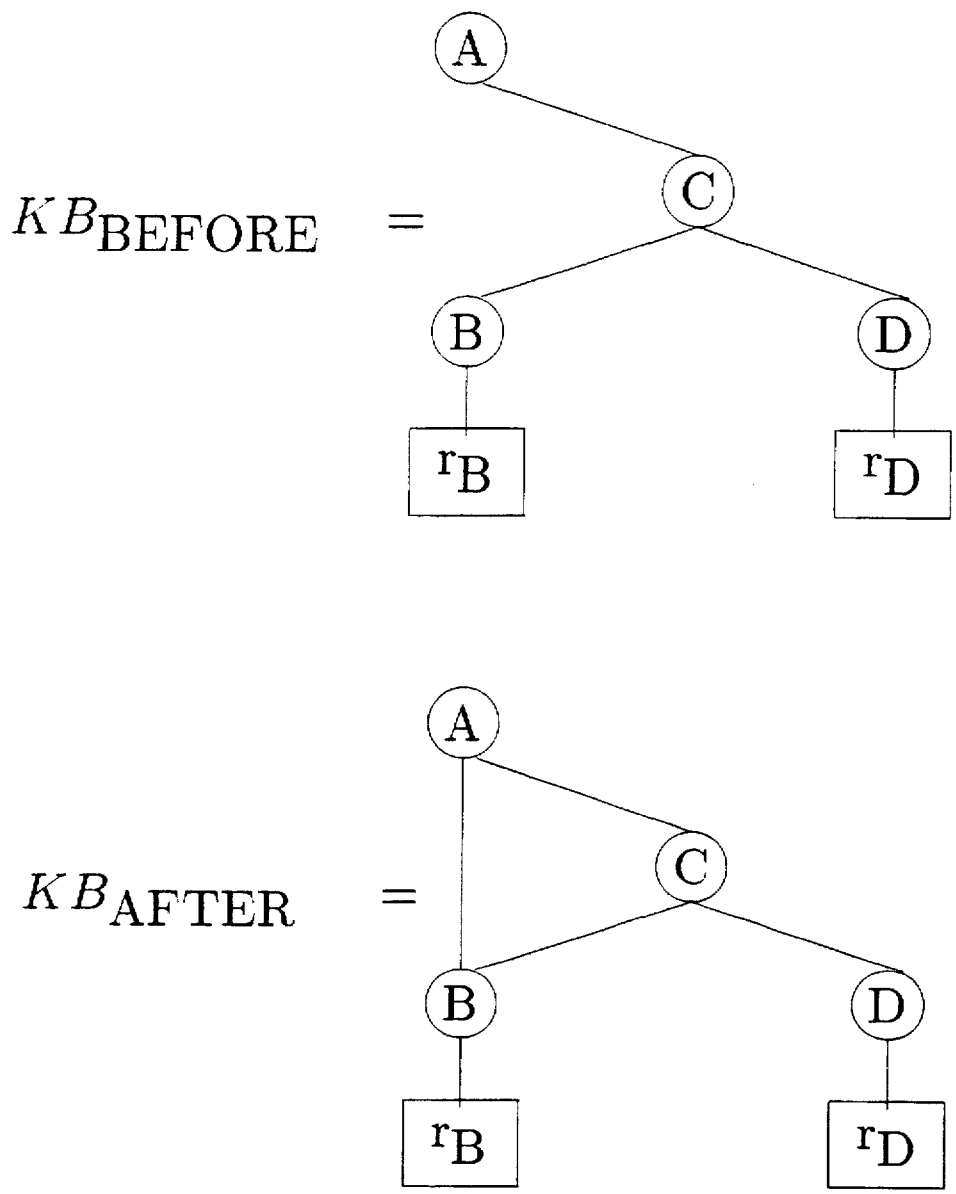
FIG. 10 illustrates the initial $KB_{before}$ and the subsequent $KB_{after}$ hierarchies used by one embodiment of the present invention.

FIG. 10 illustrates the effects of applying the revision operator $Add_{A,B,1}$ to the fault hierarchy, $KB_{before}$. Notice that each operator has an associated operator that can undo the effects of the operator. For instance applying the operator $Delete_{A,B}$ to $KB_{after}$ in FIG. 10, will restore the fault hierarchy to $KB_{before}$. Let $N(KB) = \{\theta_i(KB) | \theta_i \in T\}$ be the set of KB's neighbors.

DELTADELTA begins each hill climbing step with a particular knowledge base, KB_i. It then needs to determine whether any KB' ∈ N(KB_i) is better than KB_i; that is, whether any KB' has a higher empirical accuracy, over a set of labeled instances $C = \{<\pi_j, r_j>\}$. (If so, DELTADELTA will climb from KB_i to the KB* ∈ N(KB) with the highest empirical accuracy.)

Computing this optimal KB* implicitly requires obtaining the |C| values of $\{acc(KB, c_j)\}_{c_j \in C}$ to compute acc(KB, C), and also computing the |C|×|T| values of $\{acc(\theta_i(KB), c_j)\}$ for each $\theta_i \in T$ and each $c_j$ in C, to compute the |T| values of $\{acc(\theta_i(KB), C)\}_i$, and then determining which (if any) of these values exceeds acc(KB, C). One algorithm for this task, would first load in the KB hierarchy, then use the resulting $S_{KB}$ to evaluate $EvalKB(KB,\pi_j)$ for each $(\pi_j, r_j) \in C$ to compute first the values of $acc(KB, \pi_j)$ and then their sum $acc(KB,C) = \Sigma_j acc(KB,<\pi_j,r_j>)$. It would then build $KB_1 = \theta_1(KB)$ by applying the first revision operator $\theta_1$ to KB, then load in this hierarchy to obtain $S_{KB1}$, and once again consider the |C| instances $\{<\pi_j,r_j>\}$ to compute $acc(KB_1, C)$. Next, it would produce $KB_2 = \theta_2(KB)$, and go through all |C| instances to produce $acc(KB_2, C)$; and so forth, for all |T| transformations. In essence, this involves sequentially computing each row of the matrix shown in FIG. 12. The revision algorithm would then determine the largest of these $KB^* = argmax_i\{acc(KB_i, C)\}$, and climb to this KB* hierarchy if $acc(KB^*, C) > acc(\theta_i(KB), C)$.

This can be very expensive as (1) computing each acc $(KB_i, <\pi_j,r_j>)$, requires evaluating a hierarchy on an instance, which can be expensive; and worse, (2) both |T| and |C| can be huge, e.g., in one study, values of |T|≈10,000 were often found.

There are two basic ideas for improving the efficiency: The first is to evaluate fewer of the $(acc(\theta_i(KB),c_j))_{ij}$ entries; below are three techniques for this. The second is to provide a more efficient way to compute this quantity. For reasons explained below, we will actually use the equally-useful values $$diff(\theta, c) = acc(\theta(KB), c) - acc(KB, c)$$

$$Diff(\theta, k) = \Sigma_{j=1,k} \ldots diff(\theta, c_j)$$

which is the difference in accuracy between θ(KB) and KB, on instance c (resp., the relative score for the transformed θ(KB) knowledge base, after k instances). The resulting DELTADELTA system is sketched in FIG. 8.

The first idea, called $RT_I$, is to restrict the transformations, based on instance $<\pi_j, r_j>$ being considered. This idea exploits the particular set of transformations that are being considered. This is done by using observations that, for almost every $\pi_j$, the value of $acc(\theta_i(KB), <\pi_j,r_j>)$ is equal to $acc(KB, <\pi_j,r_j>)$ for a great many $\theta_i$'s. This means that most transformations $\theta_i$ do not influence whether a hierarchy will be correct on an instance. As an illustration, consider the $KB_0$ hierarchy (FIG. 2) and the partial instance $\pi_1 = \{t(Z)/+, t(A)/+, t(C)/-, t(D)/+\}$ that confirms t(Z), t(A), and t(D) and disconfirms t(C); here, $S_{KB_0}$ returns $r_D = EvalKB(KB_0, \pi_1)$. (Notice $S_{KB_0}$ would only ask about these 4 tests, and only record their values. The other tests would not be asked, as their values do not matter here; hence, $\pi_1$ maps each other test to "?".) Now consider the $Delete_{B,E}$ transformation that deletes the <B,E> arc, and observe that, as the original $KB_0$ arrives at its answer ($r_D$) before ever reaching B, this new $KB_1 = Delete_{B,E}(KB_0)$ will also reach the same decision; here $r_D$. As $EvalKB(KB_0, \pi_1) = EvalKB(KB_1, \pi_1)$, clearly $acc(KB_0, <\pi_1, r>) = acc(Delete_{B,E}(KB_0), <\pi_1, r>)$. (Notice this does not depend on whether $r_D$ was the correct answer: if $KB_0$ was correct on $\pi_1$, then so is $KB_1$; likewise, if $KB_0$ was incorrect on $\pi_1$, then so is $KB_1$.)

Now consider other deletions, such as deleting either the <B,F> or the <A,E> arc; by the above argument, we see immediately that $acc(KB_0, <\pi_1, r>) = acc(Delete_{B,F}(KB_0), <\pi_1, r>) = acc(Delete_{A,E}(KB_0), <\pi_1, r>)$. Notice that deleting <A,C> has no effect, as the C node was disconfirmed anyway. (Here, as we are only considering the accuracy of the hierarchy, and not its efficiency, evaluating the extra $T_c$ test is not an issue.) It should be clear that the only deletions that might make a difference here (i.e., produce a hierarchy KB'=Delete(KB_0) whose accuracy on $\pi_1$ might be different than $KB_0$'s) are deleting <Z,A> and <A,D>. (Of course, it is still possible that $acc(Delete_{Z,A}(KB_0), <\pi_1, r>) = acc(KB_0, <\pi_1, r>)$. For example, if the correct repair $r_c$, then both systems will have the score of 0. This can also happen if there are several paths in the initial hierarchy that lead to the same correct node, or if the hierarchy includes different nodes with the same repair, etc.)

Similar claims for adding new links can also be considered. As $S_{KB_0}$ never reached B, a new hierarchy that includes a new link from B to anything will return the same $r_D$ in instance $\pi_1$, meaning $acc(Add_{B,\chi_1,\chi_2}(KB_0), <\pi_1, r_2>) = acc(KB_0, <\pi_1, r_2>)$ for any node $\chi_1$ and index $\chi_2$. Similarly, as $S_{KB_0}$ descends to A's second child, $Add_{A,\chi,3}$ also has no effect, for any new child χ. There is also no effect if we add a link from A to some other node, say W, if W's test fails (i.e., if $\pi_1(t(W)) = -$), independent of where $Add_{A,W,i}$ adds this new link. Here, the only addition transformations Add that might make a difference are the ones that produce new hierarchies $KB_2 = Add(KB_0)$ that cause the $S_{KB_2}$ to take a different path, by descending from a node that could be reached (such as Z or A) to a node that could be confirmed.

Similarly, most Move and Switch transformations have no effect as well, in particular, $Move_{par1,par2,n,i}$ is guaranteed to have no effect whenever both $Delete_{par1,n}$ and $Add_{par2,n,i}$ have no effect.

Stated more precisely, DELTADELTA will only consider the subset of the transformations, returned by the RT1_ELIGIBLE routine, call them $RT_I(T,N,c_k)$, which excludes many transformations θ for which diff(θ,$c_j$)=0.

In one embodiment of the present invention, the RT1_ELIGIBLE subroutine (see FIG. 11) returns a set of transformations, based on the initial fault hierarchy KB and annotated case <π, r>, which includes:

Delete(par, n) whenever
- ¬ n is currently a child of par,
- ¬ the status of the test associated with par (resp., n) is either + or ? (ie, $\pi(t(par)) \in \{+, ?\}$), and
- ¬ par will be reached (ie, $\tau(par) > 0$, using the $\tau(\cdot)$ function defined below).

Add(par, n, i) whenever
- ¬ the status of the test associated with par (resp., n) is either + or ?
- ¬ i is between 0 and k(par),
- ¬ par will be reached (ie, $\tau(par) > 0$)
- ¬ n is not already a child of par, and
- ¬ adding n under par will not cause a cycle.

Switch(par, n1, n2) whenever
- ¬ both n1 and n2 are children of par
- ¬ the status of the test associated with par (resp., n1, n2) is either + or ?
- ¬ par will be reached (ie, $\tau(par) > 0$).

Move(par1, par2, n, i) whenever
- ¬ Add(par2, n, i) is legal, based on above specifications
- ¬ Delete(par1, n) is legal, based on above specifications
- ¬ In addition, Move(par1, par2, n, i) is allowed even if a cycle is introduced by the Add(par2, n, i), provided it is broken by the Delete(par1, n) operation.

The second insight, called $RT_P$ for "restricting the transforms based on a positive score", comes from two observations: First, DELTADELTA will only climb from KB to the transformed theory KB*=θ(KB) if KB*'s empirical score, after all M instances, is strictly greater than KB's; ie if Diff(θ,M) >0. Second, as acc(θ(KB), $c_k$) ≤ 1, the difference between Diff(θ$_i$, k) and Diff(θ$_i$, k−1) can be at most $$\textit{Diff}(\theta,k) - \textit{Diff}(\theta,k-1) = acc(\theta(KB),c_k) - acc(KB,c_k) \leq 1 - acc(KB,c_k)$$

This trivially means that Diff(θ,M)≤Diff(θ,k)+Err_k, where $Err_k 32 \Sigma^M_{j=K+1}(1-acc(KB, <\pi_j,r_j>))$ is the total error of KB on the remaining M−k instances. If Diff(θ,k)≤−Err$_k$, then clearly Diff(θ, M)≤0, which means DELTADELTA will not climb to θ(KB). Hence, $$RT_P(KB,N,Err_k,\textit{Diff}(\cdot,k))=\{\theta_i \in N | \textit{Diff}(\theta_i,k)>-Err_k\}$$

This is implemented by the RTP subroutine, shown in FIG. 9.

The third insight, called $RT_M$ for "restricting the transforms based on maximal score", is related to the $RT_P$ filter presented above, and is also based on dynamic programming. It uses two observations: First, DELTADELTA will only climb from KB to the transformed version KB*=θ'(KB) if KB*'s empirical score is the largest over all members of N(KB); ie., if $\forall \theta_i \in N$, Diff(θ*,M)≥Diff(θ$_i$,M). Second, for any $\theta_g, \theta_h \in N$, the difference between Diff(θ$_g$,k)−Diff(θ$_h$,k) and Diff(θ$_g$, k−1)−Diff(θ$_h$, k−1) can be at most 1. This trivially means that $$\textit{Diff}(\theta_g,M)-\textit{Diff}(\theta_h,M)\leq\textit{Diff}(\theta_g,k)-\textit{Diff}(\theta_h,k)+(M-k)$$

and so if $\textit{Diff}(\theta_g,k) < \textit{Diff}(\theta_h,k)-(M-k)$, then $\textit{Diff}(\theta_g,M) < \textit{Diff}(\theta_h,M)$, which means DELTADELTA will not climb to θ$_g$(KB). Letting Best$_k$=max$_{\theta \in N}$\{Diff(θ,k)\} be the largest empirical (relative) score, over the transformations, after k samples, we define $RT_M(KB,N,k,M,\textit{Diff}(\cdot,k))=\{\theta_i \in N | \textit{Diff}(\theta_i,k) > Best_k-(M-k)\}$. This is implemented by the RTM subroutine, shown in FIG. 9.

The following will describe the final idea, QE (for "quick evaluation"). Given the above analysis, we need only compute the values of acc(θ$_i$,$c_k$) for only a subset of the transformations; i.e., only for θ$_i$ in the set $$RT_i(KB,N,c_k) \cap RT_P(KB,N,Err_k,\textit{Diff}(\cdot,k)) \cap RT_M(KB,N,k,M,\textit{Diff}(\cdot,k)).$$

We could compute these acc(θ$_i$(KB), $c_k$) values by first synthesizing each KB$_i$=θ$_i$ (KB), and then "running" each KB$_i$ on each $c_j$=<$\pi_j,r_j$> instance to get their respective repairs and associated accuracy scores. The DELTADELTA algorithm, however, uses a more effective way of computing these accuracy scores.

Notice first that it is sufficient to compute diff (θ$_m$,c), rather than acc(θ$_m$(KB),c); this quantity turns out to be relatively easy to compute (especially as diff (θ$_m$,c)=0 holds for many <θ$_m$,c> pairs; see above discussion of $RT_i$).

Given a (partial) instance π and the correct repair $r_{cor}$, the QE_COMPUTERHOTAU subroutine identifies, with each node n in the initial KB, the probability ρ(n) that $S_{KB}$ would reach $r_{cor}$ given that it has reached n. Notice that acc(KB, <π,$r_{cor}$>)= ρ($n_{root}$), where $n_{root}$ is the root of KB; and also that ρ(n)=ρ'(n)×ACCKB*(n, π, $r_{cor}$), using $$p'(n) = \begin{cases} 0 & \text{if } \pi(t(n)) = - \\ 1 & \text{if } \pi(t(n)) = + \\ p(t(n)) & \text{if } \pi(t(n)) = ? \end{cases}$$

QE_COMPUTERHOTAU also identifies each arc a in KB with the probability that $S_{KB}$ will reach and traverse this arc, τ(a); and also each node n with the probably of reaching n. Clearly τ($n_{root}$)=1. Given an internal node n with children $n_i$=child(n,i), let $e_i$=<n,$n_i$> be the arc connecting n to $n_i$. Then recursively define $$\tau(e_1)=\tau(n)\times\rho'(n)$$

$$\tau(e_{j+1})=\tau(e_j)\times(1-\rho'(n_j))$$

Finally, to compute each r($n_j$), just add up the τ-values of the arcs reaching $n_j$; i.e., in general τ(m)=$\Sigma_{<n,m> \in E}$τ(<n,m>). Notice that this can be computed in time linear in the size of the hierarchy.

Then, for each transformation θ ∈ T, QE_DIFF uses these ρ(·)and τ(·) values to compute diff (θ, <θ,$r_{cor}$>), in essentially constant time. (The time is really bounded by the largest number of arcs descending from any node which is assumed to be a small constant.)

N.b., the DELTADELTA revision algorithm does not produce an explicit $S_{\theta(KB)}$ performance system, nor does it explicitly compute the value acc(θ$_i$(KB), π) on the instance π. Instead, it uses the ρ(·)and τ(·) values to produce the information it needs, directly.

The following will describe the way that QE_DIFF computes the values of diff ($\tau_k$,c)=acc(θ$_k$(KB), c)−acc(KB, c). For each "Delete-Link" transformation Delete$_{a,b}$, let KB'= Delete$_{a,b}$(KB) be the hierarchy produced by deleting from KB the link connecting node a to node b. Clearly acc(KB', <π,r>)=acc(KB, <π,r>) whenever either π(t(a))=−or π(t(b)) =−. It is therefore necessary to deal only with situations when π(t(a))∈{+,?} and π(t(b)) ∈{+,?}. Without loss of generality, we can write $$acc(KB, \langle \pi, r_{cor} \rangle) = P[\text{success before } \langle a,b \rangle] + \tau[\langle a,b \rangle] \times \rho(b) +$$

$$\tau[\langle a,b \rangle] (1 - p'(b)) \times P[\text{success after } \langle a,b \rangle \text{reached } \langle a,b \rangle] +$$

$$\tau[a] (1 - p'(a)) P[\text{success after } a]$$

where P[success before <a,b>] is the probability of reaching $r_{cor}$ following the arcs that occur strictly before reaching the <a,b> arc (in the obvious traversal of KB); P[success after <a,b>|reached <a,b>] is the probability of reaching $r_{cor}$ following the arcs that occur strictly after the <a,b> arc, given that $S_{KB}$ has reached the <a,b> arc; and P[success after a] is the probability of reaching $r_{cor}$ following the arcs that occur strictly after the a node.

For example, using $KB_0$ from FIG. 2, identify the a with the fault node "A" and b with "E". Then P[success before<a,b>] is the probability either (1) $T_Z$, $T_A$ and $T_C$ all succeed and the correct repair is $r_c$, or (2) $T_Z$, $T_A$ and $T_D$ all succeed, $T_C$ fails, and the correct repair is $r_D$. Here, P[success after <a,b>|reached <a,b>] is 0, as this is the probability of reaching a success node under A, strictly after reaching and traversing <a,b>≡<A,E>. (Notice that E has no "left-siblings" under A.) Finally, P[success after a] is the probability that $T_A$ fails, $T_B$ succeeds and either $T_E$ succeeds and the correct repair is $r_E$, or $T_E$ fails, $T_F$ succeeds and the correct repair is $r_F$.

Similarly, $$acc(KB', \langle \pi, r_{cor} \rangle) = P[\text{success before} \langle a,b \rangle] + \tau[\langle a,b \rangle] \times P[\text{success after } \langle a,b \rangle \text{reached } \langle a,b \rangle] + \tau[a](1-p'(a))P[\text{success after } a]$$

Subtracting these quantities, it is found that $$diff (\text{Delete}_{a,b}, \langle \pi, r_{cor} \rangle) = \tau[\langle a,b \rangle]\{[p'(b) \times P'] - \rho(b)\}$$

where P'=P[success after <a,b>|reached <a,b>]. The only remaining challenge is computing this P': Assume that b is the $m^{th}$ child of a, and a has k≥m children, $\{a_1, \ldots, a_m=b, a_{m+1}, \ldots, a_k\}$. Here, $P'=\Sigma^k_{l=m+1}\tau[\langle a,a_l \rangle] \times \rho(a_l)/\tau[\langle a,b \rangle]$. Notice the time required to compute this quantity is bounded by k, the number of children under node a.

To compute diff (θ, c) where θ is an "Add-Link" transformations, let $KB'=Add_{a,b,i}(KB)$ be the hierarchy produced by adding to KB a link that makes b the $i^{th}$ child of a. As before, $acc(KB', \langle \pi, r \rangle)=acc(KB, \langle \pi, r \rangle)$ whenever either π(t(a))=— or (t(b))=—, and so we will consider only π(t(a)) ∈ {+,?} and π(t(b)) ∈ {+,?}.

Assume a's $i^{th}$ child in the original KB is $n_i$; notice it will be the i+1$^{st}$ child in KB'. (If a only had i−1 children in KB, then assume this $n_i$ is a degenerate node that leads immediately to the $r_\perp$ repair.) Then $$acc(KB, \langle \pi, r_{cor} \rangle) = P[\text{success before } \langle a,n_i \rangle] +$$

$$\tau[\langle a,n_i \rangle] \times \rho[\text{success after } \langle a,n_i \rangle \text{reached } \langle a,n_i \rangle] +$$

$$\tau[a] (1 - p'(a))P[\text{success after } a]$$

and $$acc(KB', \langle \pi, r_{cor} \rangle) = P[\text{success before } \langle a,n_i \rangle] + \tau[\langle a,n_i \rangle] \times \rho(b) +$$

$$\tau[\langle a,n_i \rangle] (1 - p'(b))P[\text{success after } \langle a,n_i \rangle \text{reached } \langle a,n_i \rangle] +$$

$$\tau[a] (1 - p'(a))P[\text{success after } a]$$

meaning $$diff(Add_{a,b,i}, c) = \tau[\langle a,n_i \rangle] \times (\rho(b)p'(b) \times P[\text{success after } \langle a,n_i \rangle \text{reached } \langle a,n_i \rangle]$$

where again P[success after <a,$n_i$>|reached <a,$n_i$>]=$\Sigma^k_{l=i+1}$ θ[<a,$a_l$>]×ρ($a_l$) θ[<a,$n_l$>].

Of course, this approach is implicitly based on the earlier "partial evaluation" ideas, as embodied in the AccKB* subroutine; and in particular, as mentioned earlier, complete correctness for efficiency has been sacrificed, based on the observation that computing the correct accuracy score is intractable when considering general DAG-structured hierarchies. To see a potential problem, observe that adding a new link can easily produce a new DAG-instance within the hierarchy, which in turn may cause the computation to produce an incorrect answer. For example, consider the $KB_{before}$ hierarchy (shown in FIG. 10), and let $KB_{after}=Add_{A,B,1}(KB_{before})$ include a link from A to B that makes B, A's first child.

Now consider a labeled instance $c=\langle \pi_2, r_B \rangle$ in which $\pi_2=\{T_A/+, T_C/+, T_B/?, T_D/+\}$, and the correct repair is $r_B$. Let $p_B=\rho(T_B)$ be the probability that $T_B$, the test at the B node, succeeds. Clearly acc($KB_{before}$,c)=$p_B$, and the correct answer to acc($KB_{after}$,c)=$p_B$. However, AccKB*(A,$\pi_2$,$r_B$) would produce the incorrect answer $p_B+(1-p_B)\times p_B$. (Recall that computing the correct answer, for DAGs in general, is NP-hard). Hence, if we used AccKB* to produce the accuracy scores, $$diff(Add_{A,B,1},c)=[p_B+(1-p_B)\times p_B]-p_B=(1-p_B)\times p_B;$$

as this is greater than 0, this transformation would seem like a good idea.

However, this transformation should not be considered a good idea, for this instance. There is a simple way to correct for this particular error. Here, it is necessary to observe that the only way $S_{KBafter}$ can reach C is if the $T_B$ test fails. Hence, it is necessary to only propagate the information that reaching C means $T_B$ fails when computing the accuracy score on the post-B part of the hierarchy.

While it is NP-hard to compute even this score correctly in general, we can easily address this particular common occurrence. Associate with each node n in KB the set of all tests occurring under it; hence, AllTests(A)=$\{T_A,T_B,T_C,T_D\}$, AllTests(C)=$\{T_C, T_B,TD\}$, etc. Now when adding a new link, here adding B with test $T_B$, under A, before DELTA-DELTA computes the value of diff($Add_{A,B,1}$, c), it would first walk through the other children of the new parent (associated with the transformation) A, and potentially recompute the ρ-value of these children, given the new constraint that $S_{KBafter}$ will only reach such children if the $T_B$ test fails. To do this, DELTADELTA first matches the test $T_B$ against the tests in C's AllTests(·)-list. If $T_B$ ∈ AllTests(C), then DELTADELTA can simply use ρ(C); no further work would be required. Notice, however, that $T_B$ ∈ AllTests(C) here. DELTADELTA will therefore recompute ρ(C), in the context of a slightly modified C=$\langle \pi_2, r \rangle$ labeled instance, where $\pi_2$ includes the assignment $T_B/-$: hence, $\pi_2=\{T_A/+, T_C/+, T_B/-, T_D/+\}$. Under this new assignment, ρ(B)=0, meaning ρ(C)=0, and so ρ(A)=acc($Add_{A,B,1}$, c)=$p_B$, as desired.

The following will describe how to handle "Move-Link" Transformations. To deal with $KB'=Move_{par,par2,n,i}(KB)$, notice that $KB'=Add_{par2,n,i}(KB_1)$ where $KB_1=Delete_{par1,n}(KB)$. Hence, diff($Move_{par,par2,n,i}$,c)=acc($Move_{par,par2,n,i}(KB)$,c)−acc(KB,c)=(acc($Add_{par2,n,i}(KB_1)$,c)−acc($KB_1$,c))+ (acc($KB_1$,c)−acc(KB,c)}=diff$^{KB_1}$($Add_{par2,n,i}$,c)+diff$^{KB}$ ($Delete_{par1,n}$,c), each of which were described above. In the above, the superscript identifies the hierarchy involved.

The following will describe "Switch-Link Transformations" $Switch_{par,n1,n2}$: Using n1=child(par,$i_1$) and n2=child (par,$i_2$), observe that $Switch_{par,n1,n2}(KB)=Move_{par,par,n1,i2}(KB_1)$ where $KB_1=Move_{par,par,n2,i1}(KB)$. (Where the first transformation. $Move_{par,par,n1,i2}(KB_1)$ is ignored if $|i_1-i_2|=1$. Hence, $diff(Switch_{par,n1,n2},c)=acc(Switch_{par,n1,n2}(KB),c)-acc(KB,c)=(acc(Move_{par,par,n1,i2}(KB_1),c)-acc(KB_1,c))+(acc(KB_1,c)-acc(KB,c))=diff^{KB_1}(Move_{par,par,n1,i2},c)+diff^{KB}(Move_{par,par,n2,i1},c)$.

The above descriptions all implicitly assume that the underlying expert system will traverse fault hierarchy in the manner shown above; and in particular, will stop when reaching a repair. Some expert systems will allow the user to "verify" that the proposed repair worked effectively, and will then continue suggesting alternative repairs, if the first repair failed. This is called "verify after repair" (VAR). The present invention is also able to propose appropriate theory revisions for theories that use VAR.

It is not intended that this invention be limited to the software arrangement, or operational procedures shown disclosed. This invention includes all of the alterations and variations thereto as encompassed within the scope of the claims as follows.

We claim:

1. An efficient data-driven theory revision system comprising:

efficient learning means;

expert system means interfaced with said efficient learning means and capable of receiving input from a domain expert;

compile means connected to said expert system means;

field user input means connected to said compile means; and session transcript means connected between said field user input means and said efficient learning means wherein said efficient learning means comprises:
   RTI_ELIGIBLE means;
   RTP means; and
   RTM means.

2. An efficient data-driven theory revision system as claimed in claim 1 wherein said RTI_ELIGIBLE means comprises:

a plurality of revision operators with each of said plurality of revision operators operating on an initial knowledge base within said expert system means and efficiently producing a revised knowledge base, a collection of all revised knowledge bases being a neighborhood of said initial knowledge base.

3. An efficient data-driven theory revision system as claimed in claim 2 wherein said plurality of revision operators comprises:

an add operator (RTIADD);

a delete operator (RTIDELETE);

a move operator (RTIMOVE); and, a switch operator (RTISWITCH).

4. An efficient data-driven theory revision system as claimed in claim 2 wherein:

said plurality of revision operators move through a space of fault hierarchies with each of said plurality of revision operators efficiently mapping one hierarchy to a slightly different hierarchy.

5. A computer-implemented efficient data-driven theory revision system comprising the steps of:

utilizing learning means interfaced with expert system means connected to compile means connected to field user input means connected to session transcript means which is connected to said learning means, wherein utilizing learning means comprises the steps of:
   utilizing a RTI_ELIGIBLE subroutine;
   utilizing a COMPUTERHOTAU subroutine;
   utilizing a RTP subroutine; and,
   utilizing a RTM subroutine.

6. A computer-implemented efficient data-driven theory revision system as claimed in claim 5 wherein utilizing a RTI_ELIGIBLE subroutine comprises the step of:

utilizing a plurality of revision operators with each of said plurality of revision operators operating efficiently on a knowledge base within said expert system means and producing said neighborhood that includes a revised knowledge base.

7. A computer-implemented efficient data-driven theory revision system as claimed in claim 6 wherein utilizing a plurality of revision operators comprises the steps of:

utilizing an add operator;

utilizing a delete operator;

utilizing a move operator; and, utilizing a switch operator.

8. A computer-implemented efficient data-driven theory revision system as claimed in claim 6 wherein utilizing a plurality of revision operators comprises the step of:

moving efficiently through a space of fault hierarchies with each of said plurality of revision operators mapping one hierarchy to a slightly different hierarchy.

9. A computer implemented efficient data-driven theory revision system comprising:

efficient learning means;

expert system means interfaced with said efficient learning means and capable of receiving input from a domain expert;

compile means connected to said expert system means;

field user input means connected to said compile means; and session transcript means connected between said field user input means and said efficient learning means wherein said efficient learning means comprises:
   RTI_ELIGIBLE means;
   COMPUTERHOTAU means;
   RTP means; and,
   RTM means.

10. A computer implemented efficient data-driven theory revision system as claimed in claim 9 wherein said RTI_ELIGIBLE means comprises:

an add operator (RTIADD);

a delete operator (RTIDELETE);

a move operator (RTIMOVE); and, a switch operator (RTISWITCH).

* * * * *